United States Patent [19]

Takata et al.

[11] Patent Number: 4,953,083
[45] Date of Patent: Aug. 28, 1990

[54] DATA DRIVEN PROCESSOR

[75] Inventors: Hidehiro Takata; Shinji Komori; Toshiyuki Tamura, all of Itami; Tetsuo Yamasaki; Kenji Shima, both of Amagasaki, all of Japan

[73] Assignee: Mitsubishi Denki Kabushiki Kaisha, Tokyo, Japan

[21] Appl. No.: 373,616

[22] Filed: Jun. 28, 1989

Related U.S. Application Data

[63] Continuation of Ser. No. 157,427, Feb. 18, 1988, abandoned.

[30] Foreign Application Priority Data

Apr. 23, 1987 [JP] Japan .................................. 62-100986
Aug. 17, 1987 [JP] Japan .................................. 62-203780

[51] Int. Cl.⁵ .............................................. G06F 15/82
[52] U.S. Cl. .............................. 364/200; 364/232.22; 364/239.1; 364/241.8
[58] Field of Search ... 364/200 MS File, 900 MS File

[56] References Cited

U.S. PATENT DOCUMENTS 4,153,932  5/1979  Dennis et al. ...................... 364/200
4,644,461  2/1987  Jennings ............................. 364/200

OTHER PUBLICATIONS

Gurd et al., "The Manchester Prototype Dataflow Computer", Communication of the ACM, Jan. 1985, vol. 28, No. 1, pp. 34–52.
"µPD7281 Image Pipelined Processor", NEC Electronics Inc., Feb. 1985, pp. 1–38.
Millman, Jacob et al., "Microelectronics", second Edition, McGraw-Hill Book Company, N.Y., 1987, p. 328.
Leventhal, Lance, "Introduction to Microprocessors: Software, Hardware, Programming", Prentice-Hall, Inc., Englewood Cliffs, N.J., 1978, pp. 582, 583.
"Quantitative Evaluation of Data Flow-Rate in a Data-Driven Processor [2]", S. Yoshida et al., No. 34, National Convention of the Information Processing Society of Japan, pp. 239, 240, Mar. 1987.

Primary Examiner—Thomas M. Heckler
Attorney, Agent, or Firm—Townsend and Townsend

[57] ABSTRACT

An improved data driven processor that utilizes queue buffers in the data path to maintain optimal dataflow.

3 Claims, 6 Drawing Sheets 4,953,083

DATA DRIVEN PROCESSOR

This is a continuation of Ser. No. 157,427, filed Feb. 18, 1988, now abandoned.

BACKGROUND OF THE INVENTION

1. Field of the Invention

The present invention relates generally to microprocessors and more particularly relates to data driven processors.

2. Description of the Relevant Art

Parallel computer architectures and programs are the subject of intensive research and development. One particularly important system under investigation is the data driven processor. In this architecture, a program is represented as a directed graph including collection of points, called nodes, connected by arcs. The nodes represent program operations and the arcs depict the flow of data through the program. This architecture eliminates some of the most significant dataflow bottlenecks plaguing parallel architectures.

Investigations by researchers have shown that data flow bottlenecks caused by the data transfer rate of certain datapaths can degrade the performance of a data driven processor. These bottlenecks are described in an article by Yoshida et al. entitled "A Study of System Composition of Data Driven Microprocessor(2)" at pp. 239 and 240 of the papers of No. 34 National Convention of the Information Processing Society of Japan. March 1987.

Before discussing a particular data flow problem, a brief overview of the operation of a data driven processor will be presented with reference to FIGS. 1-4.

FIG. 1 is a schematic diagram of a data flow program showing the nodes 10 and arcs 12 of the program. In FIG. 1, data packet P1 is received at node 40, copied, and transferred to nodes 42 and 43 and data packet P2 is received at node 41, copied, and transferred to nodes 43 and 44. At node 43 a processing operation is performed that utilizes P1 and P2 as operands and generates P6 as a result. Data packet P6 is received at node 45, copied and transferred to nodes 49 and 50.

In this example, each data packet is copied twice and transferred to two nodes. In a program having a higher degree of parallelism, each data packet would be copied and transferred to more than two nodes.

FIG. 2 is a block diagram of a prior art embodiment of a data driven processor. In FIG. 2, first and second program storage units 30 and 32 are coupled to the inputs of a pair detecting unit 34 by first and second buses 36 and 38. Two outputs of a pair detecting unit 34 are coupled to the input of a processing unit 40 by a first datapath 42. The output of the processing unit 40 is coupled to the inputs of the first and second program storage units 30 and 32 by a second datapath 44.

FIG. 3 is diagram of the structure of the data packets received and processed by the various structural elements of FIG. 2 during the processing at nodes 40, 41 and 43 of the program depicted in FIG. 1.

In FIG. 3, each of the processed packets, PP1 and PP2 50 and 52, include a data field including one data word, W1 and W2 respectively, a destination field designating the nodes requiring the included data field for processing, and the processing to be executed at the designated nodes. In the program of FIG. 1, the destination of field of PP1 50 designates nodes 42 and 43 and that destination field of PP2 52 designates nodes 43 and 44.

In this example, the copying operation at node 40 is executed in the first program storage unit 30 and the copying operation at node 41 is executed in the second program storage unit 32. For PP1, first and second PSU packets 54 and 56 are generated, one for each destination node designated in the destination field of PP1. The data word stored in PP1 is copied to each of these PSU packets 54 and 56. Similarly, the data word stored in PP2 is copied to third and forth PSU packets 58 and 60 in second program storage unit 32.

These PSU data packets 54 through 60 are transferred to the pair detecting unit 34 on buses 36 and 38. The pair detecting unit 34 queues the received PSU packets and identifies pairs of PSU packets having the same node designated in their destination fields. A paired packet 62 is then generated including the words in data fields of the identified pair. For example, in FIG. 3, the first and fourth PSU packets 54 and 60, designating node 43, are paired and W1 and W2 are stored in the paired packet 62. Note that the width of the paired packet 62 is greater than the width of the processed packet 50 and PSU packet 54 because two data words are stored in its data field.

The paired packet 62 is transferred to the processing unit 40 on datapath 42. The processor then performs the processing of node 43 as encoded by the instruction field of the paired packet 62 on the operands W1 and W2 stored in the data field of the paired packet 62. A resulting data field W6 is generated as the result of the processing at node 43, with W6 destined for processing at nodes 49 and 50 after copying at node 45. Accordingly, destination nodes 49 and 50 are designated in the destination field of a processed word generated in the processing unit 34 upon completion of the processing at node 43. Further, the processing to be executed at nodes 49 and 50 is encoded in the instruction field and W6 is included in the data field of the processed packet 64. This processed packet is then transferred to one of the program storage units 30 or 32 on datapath 44. The copying operation at node 45 is then executed in the program storage unit as described above.

The flow of packets on the first and second datapaths 42 and 44 will now be described. The processing unit 40 is designed to process packets at the optimal rate Fmax. Accordingly, paired packets should arrive on the first datapath 42 and exit on the second datapath 44 at the rate Fmax. Because the second datapath 44 supplies two program storage units, the rate of receipt of packets at each storage unit is Fmax/2. However, in the present example, two PSU packets are generated for each received processed packet. Accordingly, the output rate from program storage unit 30 and 32 is Fmax. When the pair detecting unit 34 receives PSU packets at the rate Fmax, it outputs paired packets at about Fmax. Thus, the dataflow throughout the system is balanced.

However, for a program having a higher degree of parallelism, i.e., where a processed packet designates more than two destination nodes' the copying operation in the program storage unit would generate more than two PSU packets for a received processed packet. Thus, the output rate of the program storage 30 unit would exceed Fmax and cause the rate of pair generation to exceed Fmax. As stated above, the processing unit rate of processing cannot exceed Fmax, therefore the processing rate at the program storage unit must be slowed or stopped. However, if this rate is slowed than the output from the processing unit 40 must be slowed to keep from overloading the program storage unit. This circular effect results in a bottleneck at the first datapath 42.

In view of the above, it is apparent that the described dataflow bottleneck limits the degree of parallelism that can be effectively achieved in a data driven processor. A solution to this problem is urgently needed. Further, to achieve large scale integration, it is desired to solve such bottleneck problems in manner that does not add excessive hardware to the system.

SUMMARY OF THE INVENTION

The present invention is a system for reducing the effects of dataflow bottlenecks in a data driven processor. In a preferred embodiment, queue buffers are placed at selected points in the datapaths to store excess data packets when the rate of transfer of packets to the datapath exceeds an optimal rate. When this rate of transfer returns to the optimal rate the stored packets are transferred to the data path at the optimal rate.

According to one aspect of the invention, the queue buffers may be configured as delay line.

Other features and advantages of the invention will become apparent in view of the drawings and flowing detailed description.

DETAILED DESCRIPTION OF THE PREFERRED EMBODIMENTS

Figure 1:
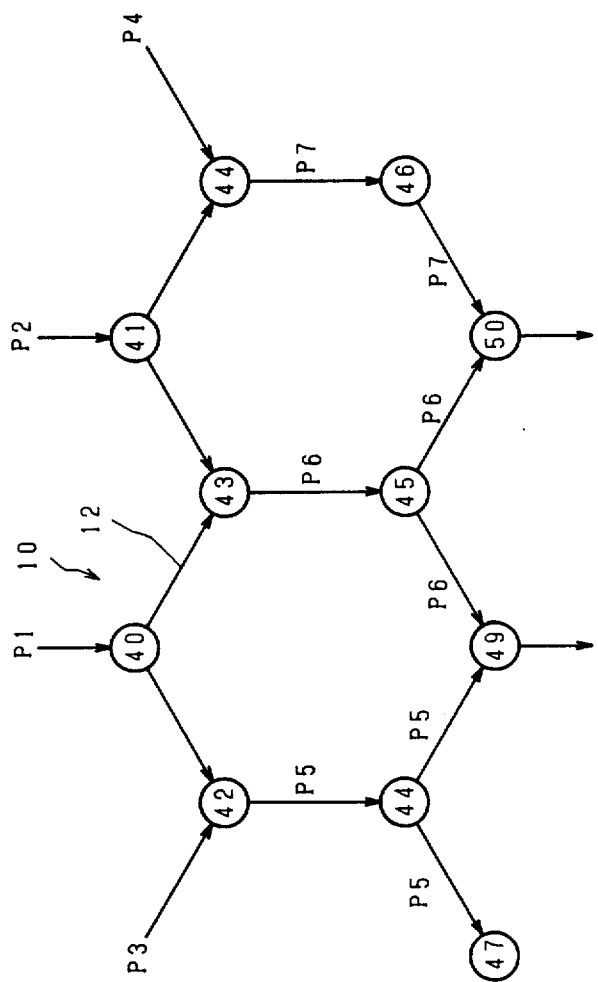
FIG. 1 is a schematic diagram of a dataflow program.
Figure 2:
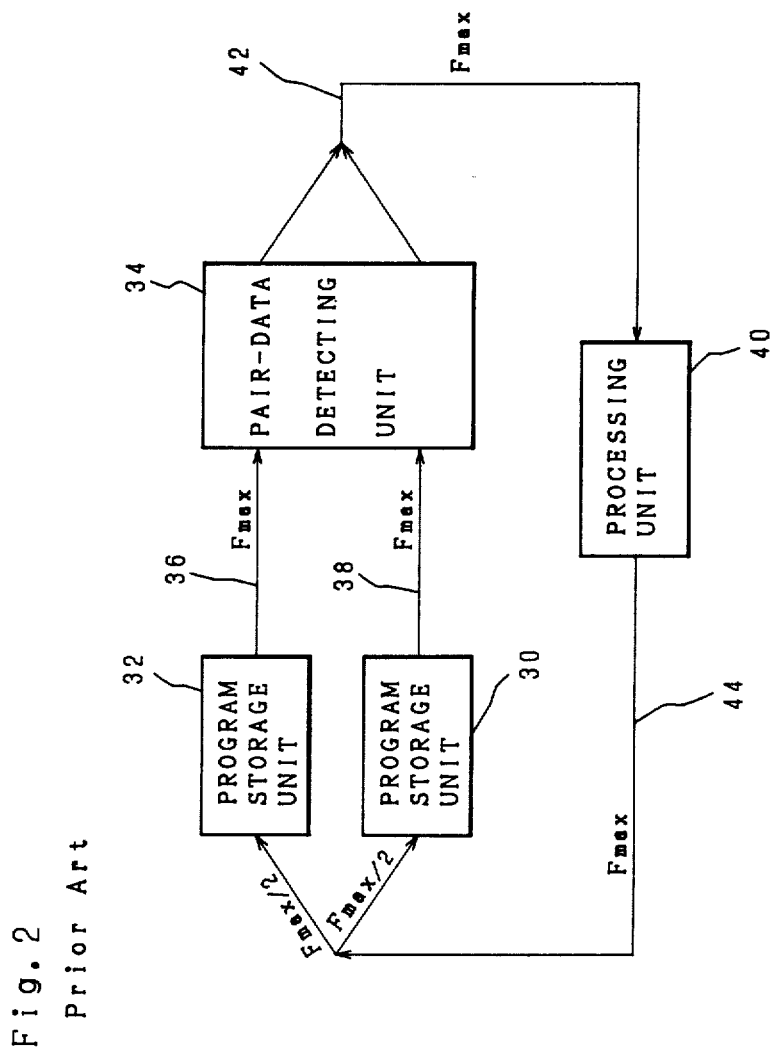
FIG. 2 is a block diagram of a conventional data driven processor.
Figure 4:
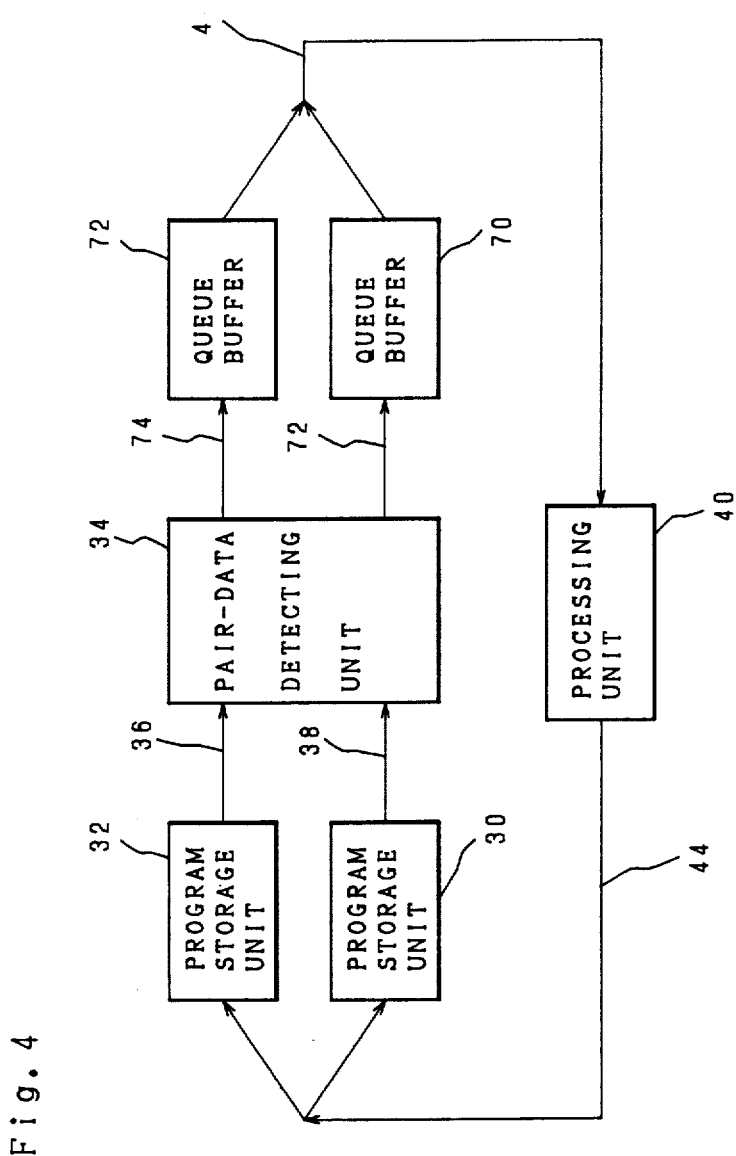
FIG. 4 is a block diagram of a first embodiment of the invention.

The invention will be described with reference to several embodiments. In each figure, identical or corresponding parts to the system depicted in FIG. 2 are given the same reference numbers. In FIG. 4, first and second queue buffers 70 and 72 have their respective inputs coupled to the outputs of the pairs detecting unit 34 by third and forth buses 72 and 74. The output of the queue buffers 70 and 72 are coupled to the first datapath 50 42.

The operation of the system depicted in FIG. 4 will now be described. For a program having a high degree of parallelism, the output rate of PSU packets from the output of the program storage unit 34 could exceed Fmax, for the reasons described above, and cause the output of the pair detecting unit to exceed Fmax. As described above, for the conventional system described with reference to FIG. 2, this condition would cause the processing rate at the program storage unit 30 or 32 to be slowed down thus causing a bottleneck.

In the system depicted in FIG. 4, this excess packet flow from the pair detecting unit 34 is absorbed in the queue buffers 70 and 72 until the output rate of the pair detecting unit 34 again returns to Fmax. At this time the excess packets stored in the queue buffers 70 and 72 is transferred to the first datapath 42 at the rate Fmax. Accordingly, due to queue buffers 70 and 72, it is not necessary to slow down the processing at the program storage units at points of high parallelism and the above-described bottleneck is eliminated.

Figure 5:
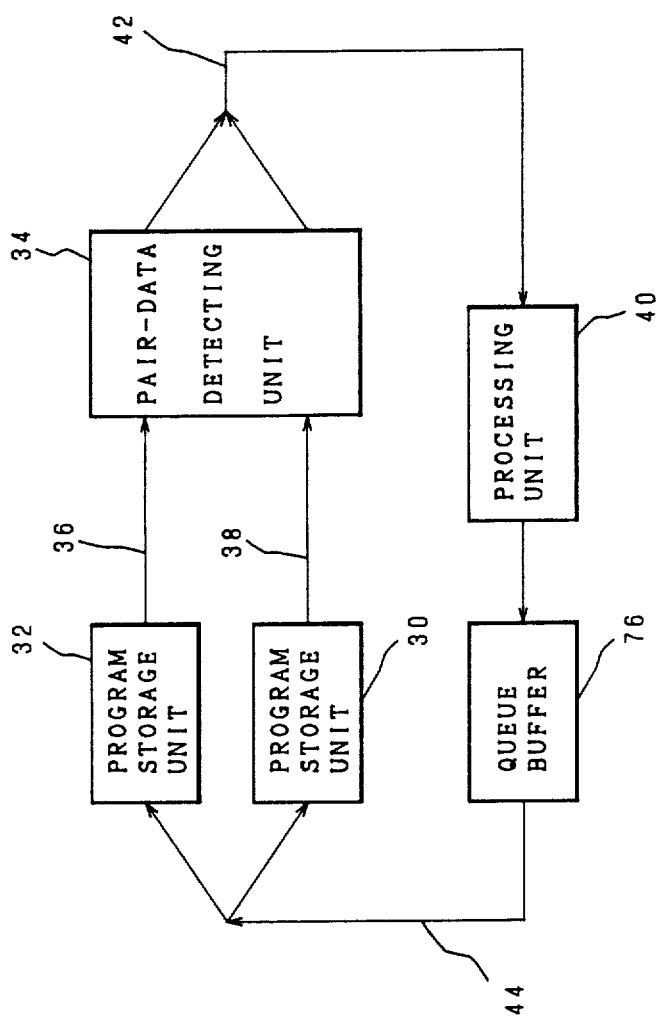
FIG. 5 is a block diagram of a second embodiment of the invention.
Figure 6:
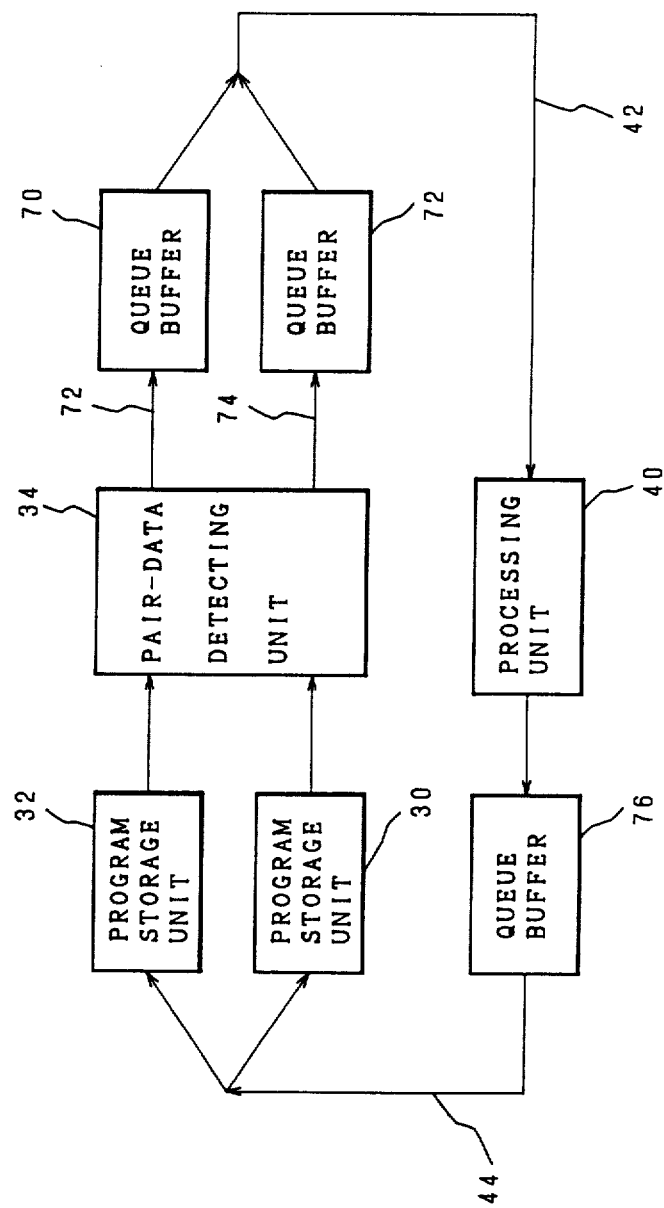
FIG. 6 is a block diagram of a third embodiment of the invention.

In FIG. 5, a second embodiment is depicted with an output queue buffer 76 having an input coupled to the output of the processing unit 40 and an output coupled to the second datapath 44. As described above, during a bottleneck the processing at the program storage units is slowed down so that the input packet acceptance rate of the program unit is less than Fmax. However, packets are received and processed at the processing unit 40 at the rate Fmax. The output buffer absorbs the excess packet flow from the processing unit 40 until the input rate at the program storage unit returns to Fmax. At this time the excess packets stored in the output queue buffer 76 are transferred to the second data path 44 at the rate Fmax.

Figure 3:
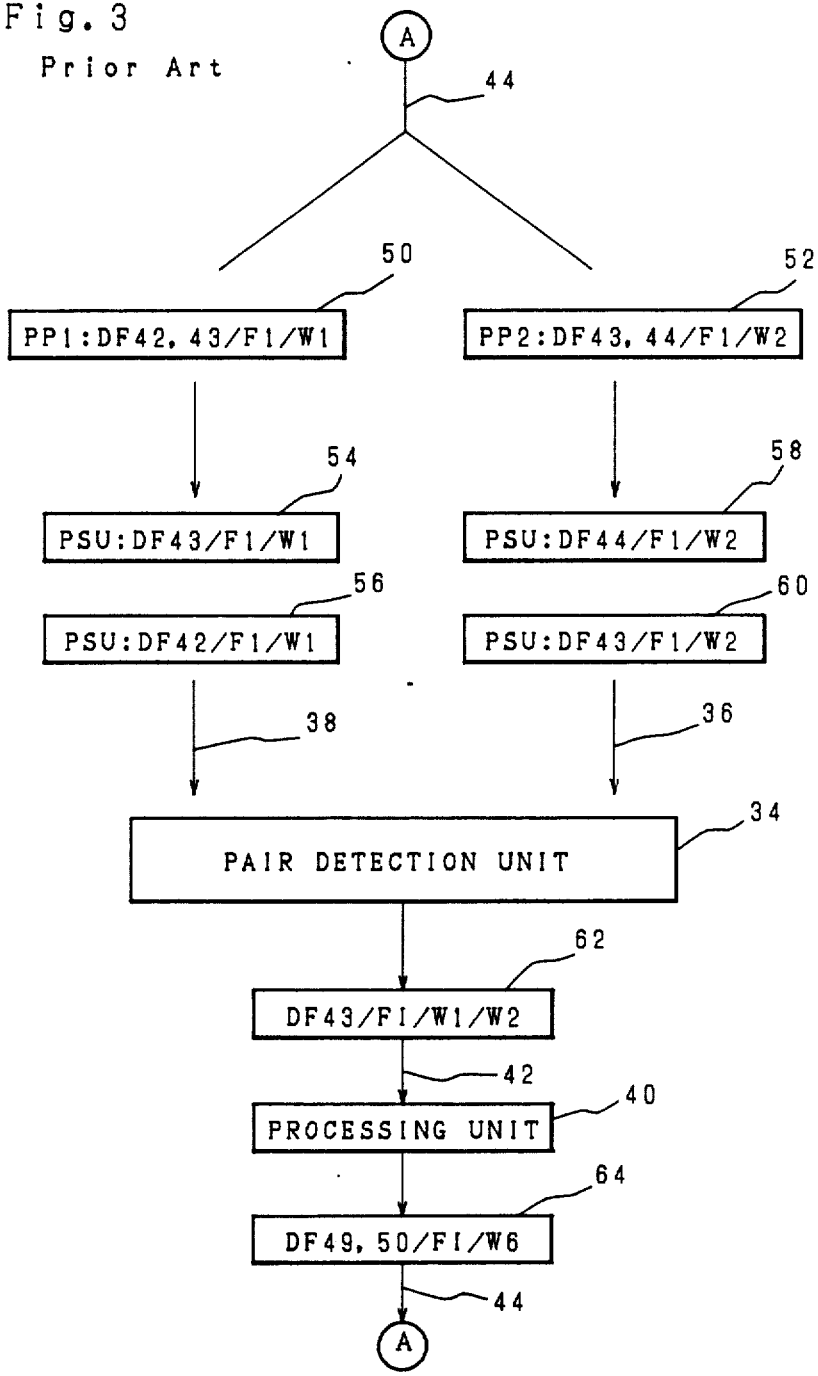
FIG. 3 is a schematic flowchart illustrating the operation of a conventional data driven processor.

This second embodiment is advantageous because the storage area required to implement the buffer is reduced due the fact that the data field of the processed packets stored includes only one word. In the first embodiment, depicted in FIG. 3, paired packets having two words in their data fields must be stored.

FIG. 5 depicts an embodiment utilizing the first and second input queue buffers 70 and 72 and the output queue buffer 76. Because of the circular nature of the dataflow bottleneck this embodiment is very effective and compensates for excess data flow at the outputs of the pair detecting unit 34 and at the input of the program storage units 30 and 32. It has been found particularly effective to design the first and second queue buffers 70 and 72 to store about five packets and the output queue buffer 76 to store about one hundred packets. Again, to limit the storage size required to implement the queue buffers 70, 72 and 74 the more storage capacity is implemented in the output queue buffer 76.

The queue buffers may be implemented as delay lines. When the data flow rate at the input of a buffer exceeds Fmax the packets are stored in the delay line until the input rate again returns to Fmax. A delay for use in a queue buffer is disclosed in a commonly assigned patent application filed (date) entitled "Handshake Type Data Transfer Circuit" attorney docket number FA078. At this point, the packets stored in the delay line are transferred to the output datapath at the rate Fmax.

What is claimed is:

1. An improved data driven processor comprising:
a program storage unit (PSU) that receives a series of processed packets, with each received processed packet including a processing field designating a plurality of N destination nodes in a program and the processing to be executed at each of the designated nodes and including a single data word, said program storage unit for copying the single data word of each received processed packet to N PSU packets and for outputting said N copied PSU packets, with each PSU packet designating a different one of said N destination nodes designated by the processing field of each received processed packet and including processing information for each designated destination node, where the magnitude of N indicates the degree of parallelism of the program and is a measure of the output rate of the program storage unit;
a pair of detecting unit, coupled to said PSU to receive said PSU packets output by said PSU and having stored therein a plurality of stored PSU packets, the pair detecting unit for identifying a given received PSU packet and a given one of said stored PSU packets that each designate the same given one of the N destination nodes in the program and for generating a paired data packet including a processing field designating said given destination node and a data field including a first paired word being the single data word included in said given PSU packet and a second paired word being the single data word included in said given stored PSU packet;

a first datapath for receiving paired packets at a rate not to exceed Fmax, where processing at said program storage unit is slowed or stopped if paired packets are received at said first datapath at a rate exceeding Fmax;

an input buffer, having an input coupled to said pair detecting unit to receive paired packets from said pair detecting unit and an output coupled to said first datapath, for transferring said received paired packets to said first datapath at a stable first buffer output rate with said input buffer having a minimum paired packet capacity required to prevent paired packets from being received at said first datapath at a rate exceeding Fmax;

a processing unit, coupled to said input buffer by said first datapath to receive said paired data packets, for executing the processing operations specified in the processing field of each received paired packet on the first and second words of each received paired packet to generate processed packets, each processed packet including a single processed data word resulting from said processing and including a processing field designating a second plurality of destination nodes in a program, with said processing unit capable of receiving and processing paired data packets and of outputting processed packets at a rate equal to Fmax and with the storage area required to store a paired packet being about double the storage area required to store a processed packet; and an output buffer, having an input coupled to said processing unit to receive said processed packets at the output rate of said processing unit and having an output coupled to said PSU to transfer received processed packets to said PSU, said output buffer for storing processed packets when processing is slowed or stopped at said program storage unit so that said processing unit may continue outputting processed packets at Fmax, with all of a combined buffer packet storage capacity required to prevent a data flow bottleneck allocated to said output buffer except for said minimum packet capacity required to prevent paired packets from being received at said first datapath at a rate exceeding Fmax so that the storage area required to implement said combined buffer packet storage capacity is reduced.

2. The invention of claim 1 with said input buffer having capacity to store five paired packets and with said output buffer having capacity to store one hundred processed packets.

3. The invention of claim 2 wherein said input buffer is a delay line for providing data at a steady rate to said processing unit.

* * * * *